(12) United States Patent
Tentrup et al.

(10) Patent No.: US 7,104,118 B2
(45) Date of Patent: Sep. 12, 2006

(54) VEHICLE TEST STAND

(75) Inventors: Thomas Tentrup, Merzig (DE); Jan Schenk, Nettetal (DE); Ottmar Gehring, Kernen (DE); Harro Heilmann, Ostfildern (DE); Andreas Schwarzhaupt, Landau (DE); Gernot Spiegelberg, Heimsheim (DE); Wolfgang Stahl, Oberboihingen (DE); Armin Sulzmann, Oftersheim (DE)

(73) Assignee: Schenck Final Assembly Products GmbH, Puttlingen (DE)

( * ) Notice: Subject to any disclaimer, the term of this patent is extended or adjusted under 35 U.S.C. 154(b) by 0 days.

(21) Appl. No.: 10/875,118

(22) Filed: Jun. 23, 2004

(65) Prior Publication Data
US 2005/0022587 A1    Feb. 3, 2005

(30) Foreign Application Priority Data
Jun. 25, 2003    (DE)    ................. 103 28 461

(51) Int. Cl.
*G01L 3/26*    (2006.01)
*G01M 15/00*    (2006.01)
(52) U.S. Cl. ............................ 73/116; 73/117; 73/118.1
(58) Field of Classification Search ................. 73/117.1
See application file for complete search history.

(56) References Cited

U.S. PATENT DOCUMENTS

| 3,277,702 | A |   | 10/1966 | Brenneke |
| 4,669,318 | A |   | 6/1987  | Angstrom |
| 4,939,985 | A |   | 7/1990  | Von Thun |
| 5,231,870 | A |   | 8/1993  | Fukuda et al. |
| 5,452,605 | A | * | 9/1995  | Wilson et al. ................. 73/117 |
| 6,044,696 | A | * | 4/2000  | Spencer-Smith ............. 73/117 |
| 2002/0040600 | A1 |   | 4/2002  | Lenzen et al. |

FOREIGN PATENT DOCUMENTS

| DE | 2 139 229 | 2/1973 |
| DE | 38 12 824 A1 | 11/1989 |
| DE | 41 36 508 A1 | 5/1993 |
| EP | 0 338 373 A2 | 10/1989 |
| GB | 389050 | 3/1933 |

* cited by examiner

*Primary Examiner*—Edward Lefkowitz
*Assistant Examiner*—Freddie Kirkland, III
(74) *Attorney, Agent, or Firm*—Leydig, Voit & Mayer, Ltd.

(57) ABSTRACT

The invention relates to a vehicle test stand including a device for fixing a motor vehicle on the test stand. A loading machine is adapted to be coupled to the drive train of the motor vehicle, whereby the loading machine can both drive and brake the drive train. In accordance with the invention, the loading machine is directly or indirectly connectable to a rim of a motor vehicle wheel in force-locking manner.

6 Claims, 3 Drawing Sheets

VEHICLE TEST STAND

FIELD OF THE INVENTION

The present disclosure relates to the subject matter disclosed in German Patent Application No. 103 28 461.3 of Jun. 25, 2003, the entire specification of which is incorporated herein by reference.

The invention relates to a vehicle test stand including the features indicated in the embodiments described herein as well as to a method of testing components in the drive train of a motor vehicle including the features also described herein.

BACKGROUND OF THE INVENTION

A test stand for testing the drive train of a vehicle is known from EP 0 338 373 A2. Therein, two mutually independent moment-regulated electrical loading machines are flanged directly onto the shafts in the drive train being tested. Rollers upon which the wheels of the vehicle are adapted to roll are not used here. A simulation of the rolling resistances, the wheels and the behaviour of the vehicle under acceleration exclusively of the vehicle components present in the form of real parts is made by means of a simulating computer.

OBJECTS AND SUMMARY OF THE INVENTION

In contrast thereto, the object of the invention is to provide a vehicle test stand and a method with the aid of which the components in the drive train of a motor vehicle can be examined without heavy structural expenditure.

This object is achieved in regard to the test stand by the features of embodiments and methods described herein.

The fundamental concept of the invention is to connect a loading machine directly or indirectly to a rim of a motor vehicle wheel in a force locking (non-positive) manner. Hereby, it is merely necessary to establish a connection between the loading machine and the wheel rim but without there being any need to disassemble the wheels and, for example, assembling a connecting shaft for the purposes of making a connection to the existing drive train in the vehicle being examined. Consequently, the set-up time required for the preparation of the test is very short.

The loading machines employed may be in the form of electrical or even hydraulic motors whose rotational speed and/or moment is controlled, such as e.g. asynchronous motors.

One exemplary embodiment of the invention envisages that a gear box should be arranged between the loading machine and the wheel rim. Thus, for example, standardised loading machines can be used for passenger vehicles and commercial motor vehicles that are to be tested and whose wheels are driven at different speeds. The gear box may be in the form of a toothed gear assembly or else a speed-reducing or speed-increasing arrangement utilising belt drives of different pulley size could be used for example.

In another exemplary embodiment, a shaft coupling is arranged between a loading machine and a steerable wheel of the motor vehicle. It is thereby ensured that the steering system of the vehicle under examination can also be used on the test stand. This is important for example, if the energy consumption of a power-assisted steering system is to be realistically imaged during a test on the test stand.

A shaft coupling can be implemented by means of cardan joints, tripod or homokinetic joints or else by means of frictional rubber discs for example.

Further advantages are derivable from the other dependent claims and also from the exemplary embodiment of a vehicle test stand in accordance with the invention which is described in more detail hereinafter with the aid of the drawings and the two test runs that are adapted to be implemented on the test stand.

DESCRIPTION OF EMBODIMENTS

Figure 1:
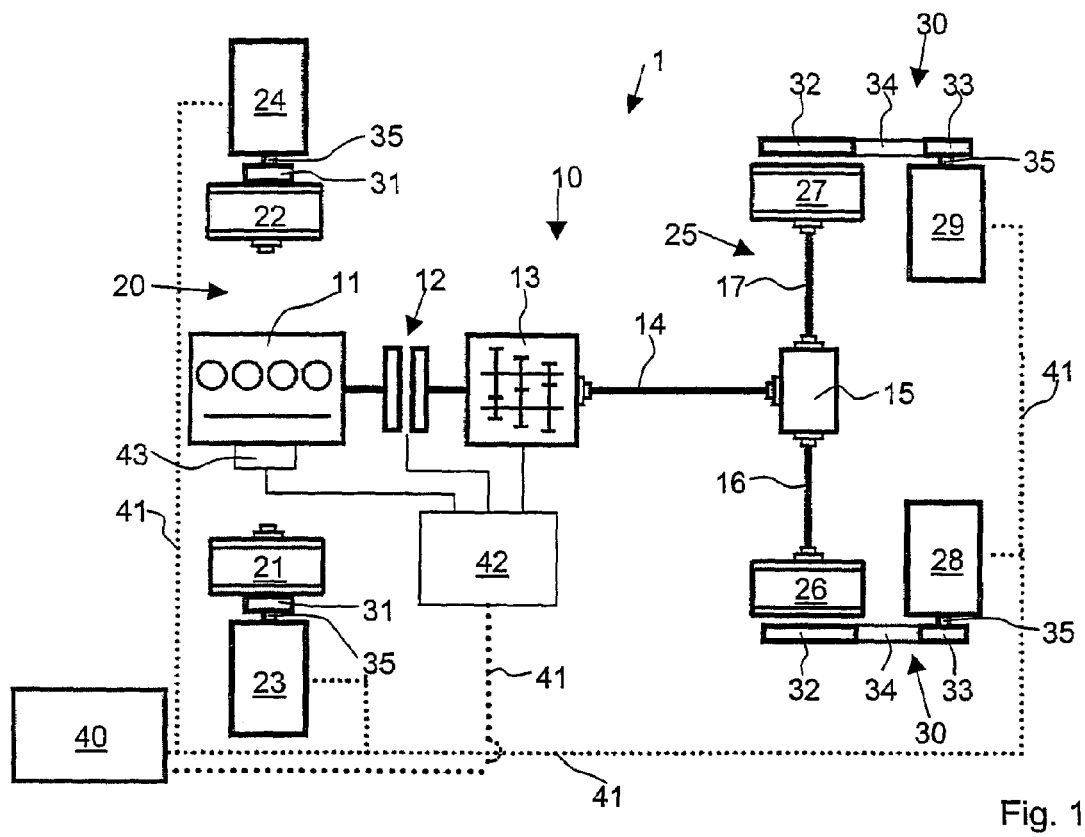
FIG. 1 shows a schematic plan view of a vehicle test stand including the abstracted components of a motor vehicle, FIG. 2 a plan view of a construction for the framework of the test stand, FIG. 3 a flow chart used for a functional inspection of an anti-blocking system (ABS), FIG. 4 a flow chart used for a functional inspection of an anti-slip regulating system (ASR).

A vehicle test stand 1 in accordance with the invention is schematically illustrated in FIG. 1. A vehicle 10 is shown therein in abstracted form. The vehicle 10 comprises an internal combustion engine 11 which is connected to the input of a gear box 13 by a clutch 12. The output of the gear box 13 is connected via a drive shaft 14 to a rear axle differential 15 from which extend the lateral propeller shafts 16, 17 that drive the wheels 26, 27 on a driven rear axle 25 of the vehicle 10.

The vehicle 10 comprises two steerable vehicle wheels 21, 22 on the front axle 20. In the case of an all-wheel drive, these wheels can be connected by lateral propeller shafts to a front axle differential, the latter being connected to the gear box 13.

All four vehicle wheels 21, 22, 26, 27 are connected to loading machines 23, 24, 28, 29. The loading machines 23, 24, 28, 29 on the wheels 21, 22 of the front axle 20 are bolted directly to the rims of the wheels 21, 22 by means of wheel bolts for example. A shaft coupling 31 is arranged between the output shaft 35 of a loading machine 23, 24 and the wheel rim in order to ensure the steering function of the front wheels 21, 22.

The loading machines 28, 29 for the rear axle 25 are connected to the wheels 26, 27 on the rear axle 25 by means of a transmission 30 in the form of a belt drive. To this end, a pulley 32 is bolted to the wheel rim of a wheel 26, 27 by means of wheel bolts for example. A pulley 33 of smaller diameter is connected to the output shaft 35 of a loading machine 28, 29. The belt drive 34 is tensioned between the differently sized pulleys 32, 33.

The loading machines 23, 24, 28, 29 are connected by signal lines 41 to an evaluation and control unit 40. Moreover, there is a releasable connection via a further signal line 41 between the evaluation and control unit 40 and a drive train control unit 42 of the vehicle 10. The drive train control unit 42 is connected to an engine control unit 43 which controls the injection of the fuel, the ignition timing and/or a possibly provided throttle valve for example. In like manner, the drive train control unit 42 is connected to the clutch 12 and the adjustable gear box 13 whereby the transmission of power from the internal combustion engine 11 to the propelled wheels 26, 27 is controllable.

Different programs, with the aid of which different components or system units of the vehicle 10 on the test stand 1 can be examined, are executed in the evaluation and control unit 40. Such a test equipment is also called a hardware-in-the-loop system.

Figure 2:
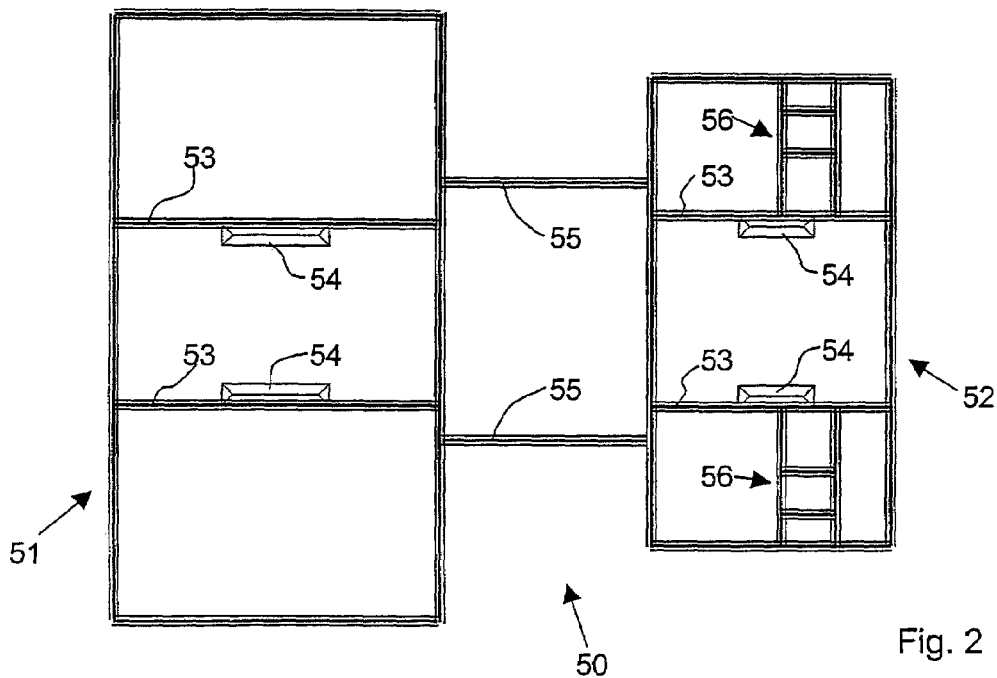

The constructional framework 50 of the test stand 1 is illustrated in FIG. 2. Rectangular framework superstructures 51, 52 are provided in the vicinity of the front and rear axles 20, 25. The beams preferably have a double-T flanged beam section and/or an I-beam section. The frameworks 51, 52 are crossed in each case by two longitudinal braces 53. Holding devices 54 are provided on these longitudinal braces 53, the vehicle 10 being connected to the test stand 1 by means of these devices. Here, the latter are in the form of supports to which the axles of the vehicle 10 under test are linked by means of spring shackles for example. The supports are connected to the longitudinal braces 53 in longitudinally and transversely displaceable manner in order to ensure that the test stand 1 can be adapted to different types of motor vehicle having different wheel bases and track widths. If necessary, the supports can be varied somewhat in length in order to raise the vehicle 10 and in particular the vehicle wheels 21, 22, 26, 27 from the stand surface so that they can be moved freely.

The two framework superstructures 51, 52 associated with the front and rear axles 20, 25 are connected together by two central longitudinal members 55. The mounting frames 56 supporting the loading machines 28, 29 on the framework 52 associated with the rear axle 25 are illustrated by way of example.

Different test programs can be executed in the evaluation and control unit 40, of which two program sequences are outlined in exemplary manner hereinafter.

Figure 3:
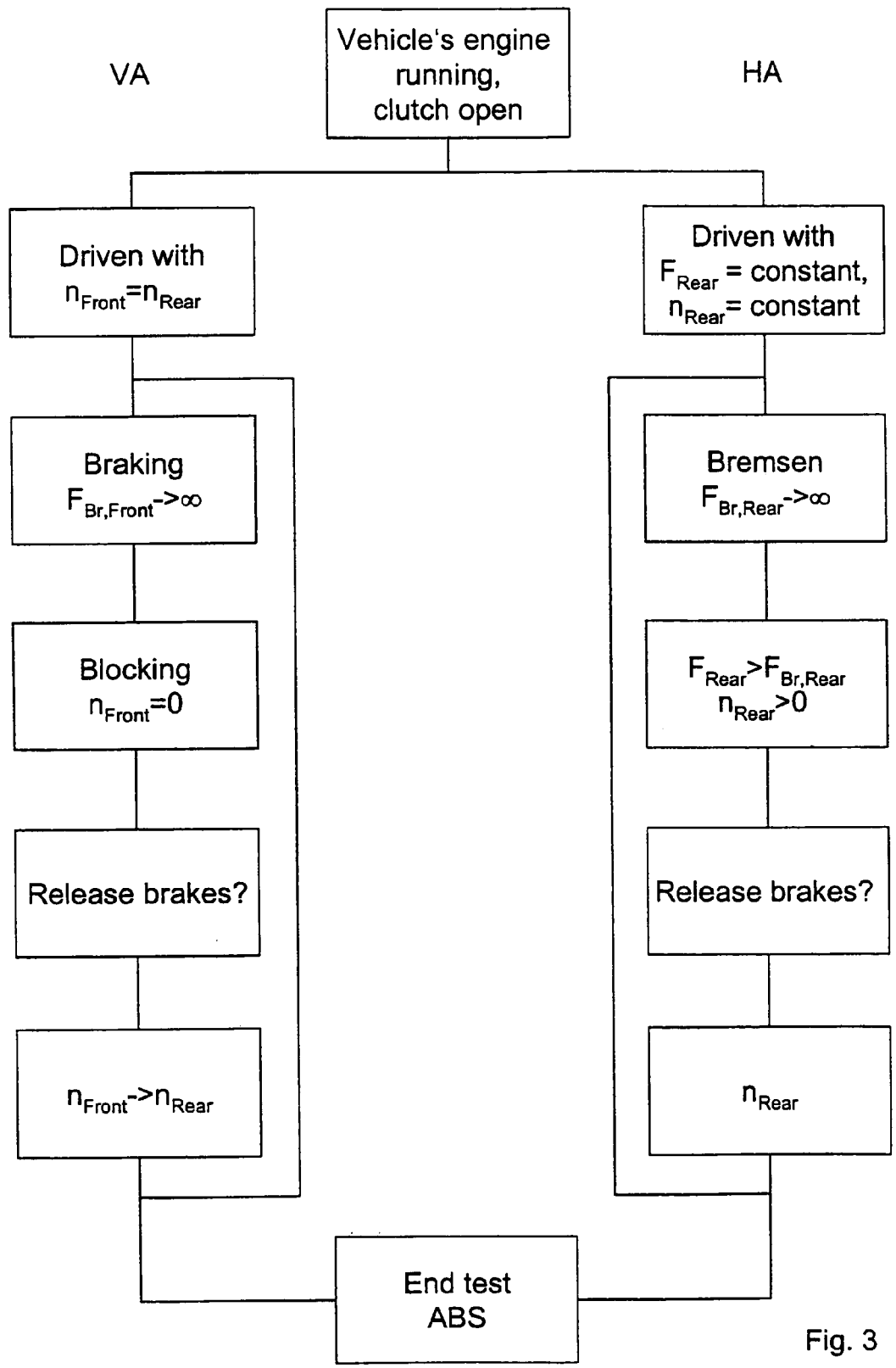

The program sequence involved in an ABS test for a commercial motor vehicle is illustrated in FIG. 3. Hereby, the processes for the non-driven front axle 20 used in this example are illustrated on the left-hand side whilst those for the driven rear axle 25 are illustrated on the right-hand side.

The test starts by starting the internal combustion engine 11 of the commercial motor vehicle in order to establish the ready status of the vehicle brakes which are usually operated pneumatically. The clutch 12 remains opened so that the drive train can be operated under no-load conditions. The rear wheels 26, 27 are subjected to a constant drive force $F_{rear}$ by the loading machines 28, 29 associated with the rear axle 25. This force is in equilibrium with a force which is caused by friction in the drive train between the gear box 13 and the rear wheels 26, 27. Consequently, the wheels 26, 27 on the rear axle 25 are set to a constant wheel rotational speed $n_{rear}$. The evaluation and control unit 40 determines this wheel rotational speed on the basis of the rotational speeds of the loading machines 28, 29 associated with the rear axle 25. The wheels 21, 22 are driven by the loading machines 23, 24 associated with the front axle 20 so that the same wheel rotational speeds occur at the front axle 20 as at the rear axle 25. Travel in a straight line at constant speed of the vehicle 10 under test is thereby simulated.

A constantly increasing braking torque is applied to the vehicle wheels 21, 22, 26, 27 by actuating the vehicle's brakes. This can be effected by actuating the brake pedal or by triggering the drive train control unit 42 that is connected to the brake control system. The rear wheels 26, 27 rotate for as long as the drive moment of the loading machines 28, 29 for the rear axle 25 is greater than the braking torque produced by the vehicle brakes. The braking force produced by the vehicle brakes and/or the braking torque on the rear wheels 26, 27 is determined by the evaluation and control unit 40 via the loading machines 28, 29. The reduction in the speed of the vehicle is determined from a vehicle-specific characteristic field stored in the evaluation and control unit 40. The loading machines 23, 24 control the wheels 21, 22 on the front axle 20 in corresponding manner so that the rotational speeds of the front wheels 21, 22 decrease accordingly. In addition, the vehicle brakes are effective on the front wheels 21, 22 in like manner.

As soon as one or more vehicle wheels 21, 22, 26, 27 block, i.e. they have a rotational speed n=0, and the vehicle has not yet come to a complete stop in accordance with the model running in the evaluation and control unit 10, the anti-blocking system (ABS) of the vehicle 10 intervenes and opens, in a wheel-selective manner, the respective brake associated with the wheel 21, 22, 26, 27 having the rotational speed n=0 so that this vehicle wheel 21, 22, 26, 27 can be accelerated back up to the rotational speed defined by the model before the brake again brakes the wheel 21, 22, 26, 27 and possibly blocks it afresh.

In the event that the brake is not opened again in the example that has just been described, there is a fault in the ABS system. This is registered and transmitted onwardly or processed by the evaluation and control unit 40.

Figure 4:
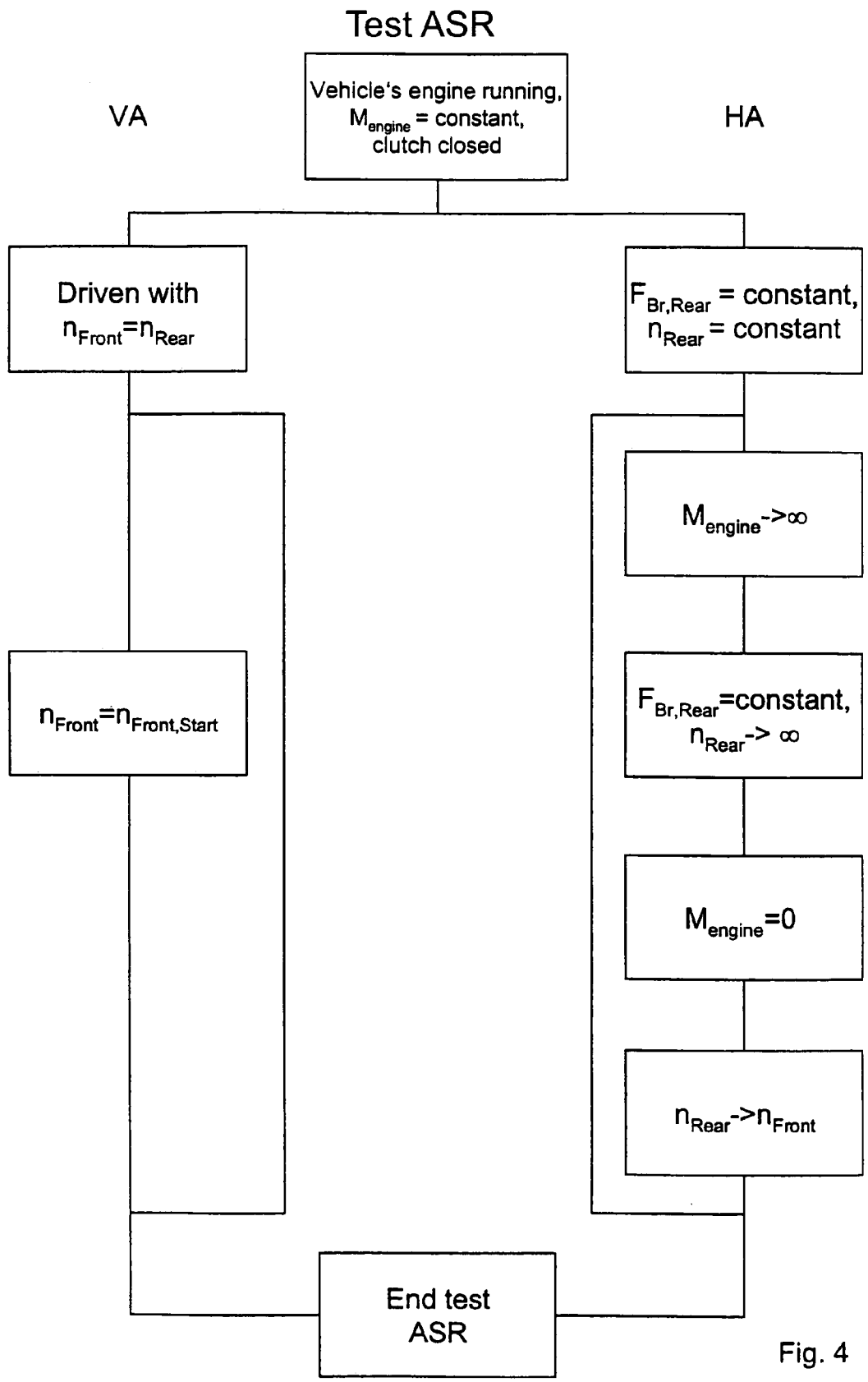

FIG. 4 shows a test sequence for testing the operability of an anti-slip regulating system (ASR). Here too, the processes occurring at the front axle 20 are illustrated on the left-hand side whilst the processes occurring at the rear axle 25 are illustrated on the right-hand side.

After the internal combustion engine 11 has started, the clutch 12 is closed so that a constant wheel rotational speed is set up for the wheels 26, 27 on the rear axle 25 when the engine torque is constant and there is a constant braking force on the driven rear axle 25. The constant braking force on the rear wheels 26, 27 is produced by the loading machines 28, 29 for the rear axle 25.

The evaluation and control unit 40 determines the wheel rotational speed at the rear axle 25 from the rotational speed of the loading machines 28, 29 and controls the loading machines 23, 24 for the wheels 21, 22 on the front axle 20 in corresponding manner so that travel in a straight line at constant speed of the vehicle 10 is again simulated in like manner.

The engine torque of the internal combustion engine 11 is now increased in a virtually step-like manner under the control of the drive train control unit 42 so that the wheel rotational speed for the drive axle 25 increases accordingly since the braking force produced by the loading machines 28, 29 for the rear axle 25 has remained constant. The wheels 21, 22 on the front axle 20 continue to be driven by the loading machines 23, 24 at the rotational speed occurring after the starting process so that there is now a difference in rotational speed between the driven axle 25 and the non-driven axle 20. This difference in the rotational speeds is detected by the anti-slip regulating system (ASR). The ASR thereupon intervenes in the engine control system 43 and, for example, suppresses the fuel injection process, adjusts the firing angle, closes the throttle valve and/or, in the case of an available electronic stability program (ESP), briefly closes the brake associated with the "spinning" wheel 26, 27, i.e. the wheel being subjected to a large increase in rotational speed, so that the drive moment on the wheel 26, 27 is reduced to zero for a short period of time. The rear wheels 26, 27 are then re-matched to the wheel rotational speed of the front wheels 21, 22 by the loading machines 28, 29 for the rear axle 25.

If the engine torque is not reduced by the ASR system during the step-like increase in engine torque and rear wheel rotational speed, then the ASR system is faulty, this being determined and transmitted onwardly or otherwise processed by the drive and control unit 40.

It is easily comprehended that the vehicle wheels 21, 22, 26, 27 on the two sides of the vehicle can be driven or braked by the loading machines 23, 24, 28, 29 in a different manner and separately from one another. Consequently, the tests described above can also be carried out in a wheel-selective manner, thus for example, only one wheel 21, 22, 26, 27 can block in the case of the ABS test or only one wheel 21, 22, 26, 27 can spin in the case of the ASR test.

Still further hardware-in-the-loop tests such as e.g. tests for determining the friction in the drive train can also be effected with the aid of the test stand 1 in accordance with the invention. To this end, the vehicle wheels 21, 22, 26, 27 are accelerated with a certain force by the loading motors 23, 24, 28, 29 in the no-load operational state of the vehicle 10. The curve of wheel rotational speed with respect to time permits conclusions to be drawn in regard to the friction in the drive train. The friction of the components can be determined by comparing the tests which are effected when these components are in their connected state and when in the non-connected state thereof.

We claim as our invention:

1. A vehicle test stand for testing a motor vehicle, the motor vehicle having a drive train, at least one axle and a motor vehicle wheel rim, the vehicle test stand including
 a framework comprising at least one holding device for fixing at least one axle of the motor vehicle on the test stand;
 at least one loading machine adapted to be coupled to the drive train of the motor vehicle, whereby the loading machine can both drive and brake the drive train, the loading machine being connectable at least one of directly or indirectly to the motor vehicle wheel rim in a force-locking manner; and
 an evaluation and control unit and at least one control line, the loading machine being connected to the evaluation and control unit by the at least one control line, the evaluation and control unit adapted to connect to a drive train control unit on the vehicle.

2. The vehicle test stand in accordance with claim 1, further comprising a gear box arranged between the loading machine and the wheel rim.

3. The vehicle test stand in accordance with claim 1, further comprising a shaft coupling between the loading machine and a steerable wheel of the motor vehicle.

4. The vehicle test stand in accordance with claim 1, further comprising a loading machine associated with each wheel of the motor vehicle, at least one of said loading machines being adapted to sense at least one of a wheel rotational speed and a torque of the respective motor vehicle wheel.

5. The vehicle test stand in accordance with claim 4, wherein the loading machine is connected to said evaluation and control unit by at least one of said control lines.

6. The vehicle test stand in accordance with claim 1, wherein the evaluation and control unit controls
 at least one of a loading machine and a drive train control unit of the motor vehicle using a test program, whereby a change in a variable parameter in the drive train is effected, and
 wherein the evaluation and control unit compares the change in the variable parameter with a reference change stored in the test program and provides a test result.

\* \* \* \* \*